United States Patent
Tang et al.

(10) Patent No.: US 12,413,604 B2
(45) Date of Patent: Sep. 9, 2025

(54) BLOCKCHAIN-BASED BIG DATA ANALYSIS AND DECISION-MAKING SYSTEM AND METHOD

(71) Applicant: JINAN JUBANG INFORMATION TECHNOLOGY CO., LTD, Shandong (CN)

(72) Inventors: Zhilin Tang, Jinan (CN); Wei Cui, Jinan (CN); Hao Song, Jinan (CN); Bin Liu, Jinan (CN)

(73) Assignee: JINAN JUBANG INFORMATION TECHNOLOGY CO., LTD, Jinan (CN)

( * ) Notice: Subject to any disclaimer, the term of this patent is extended or adjusted under 35 U.S.C. 154(b) by 289 days.

(21) Appl. No.: 18/172,074

(22) Filed: Feb. 21, 2023

(65) Prior Publication Data

US 2023/0269260 A1  Aug. 24, 2023

(30) Foreign Application Priority Data

Feb. 21, 2022  (CN) .......................... 202210154325.X

(51) Int. Cl.
*H04L 9/00* (2022.01)
*G06F 16/2455* (2019.01)
*H04L 9/40* (2022.01)

(52) U.S. Cl.
CPC ...... *H04L 63/1416* (2013.01); *G06F 16/2455* (2019.01); *H04L 63/20* (2013.01)

(58) Field of Classification Search
CPC . H04L 63/1416; H04L 63/20; G06F 16/2455; G06F 16/2291; G06F 16/27; G06Q 10/0637
See application file for complete search history.

(56) References Cited

U.S. PATENT DOCUMENTS

| | | | | |
|---|---|---|---|---|
| 11,196,771 | B2 * | 12/2021 | Olson | G06F 16/275 |
| 2007/0192863 | A1 * | 8/2007 | Kapoor | H04L 67/63 |
| | | | | 726/23 |
| 2014/0165207 | A1 * | 6/2014 | Engel | H04L 41/142 |
| | | | | 726/25 |

(Continued)

*Primary Examiner* — Syed M Ahsan
(74) *Attorney, Agent, or Firm* — Oliff PLC

(57) ABSTRACT

A blockchain-based big data analysis and decision-making system and method implement consolidation of a key mapping table preset by the system. On-chain storage of a blockchain can be adopted, thereby avoiding missing an association relationship of security policy query when performing decision-making in network security events. By taking a security event as a unit, network attack data can be separated at an appropriate granularity more reasonably by analyzing network security attack events and fault events and performing targeted decision-making based on event-based attack information, thereby implementing differentiated protection of network security and more accurate granularity of network security protection. Based on security attack big data in a cloud computing system, event-based security information big data can be migrated to a cloud to consolidate storage. The system can acquire relevant information of historical security events out of band to assist in performing blockchain-based event-based target intelligent big data analysis and decision-making.

5 Claims, 3 Drawing Sheets

(56) References Cited

U.S. PATENT DOCUMENTS

| | | | | |
|---|---|---|---|---|
| 2015/0128263 A1* | 5/2015 | Raugas | ................ | G06F 21/552 |
| | | | | 726/23 |
| 2017/0063907 A1* | 3/2017 | Muddu | ............... | H04L 63/1416 |
| 2017/0243028 A1* | 8/2017 | LaFever | .............. | G06F 21/6254 |
| 2021/0344717 A1* | 11/2021 | Shetty | ................... | H04L 9/0637 |
| 2023/0128246 A1* | 4/2023 | Bekale Be Ntoutoume | ................ | |
| | | | | G06Q 20/14 |
| | | | | 705/7.28 |

* cited by examiner

BLOCKCHAIN-BASED BIG DATA ANALYSIS AND DECISION-MAKING SYSTEM AND METHOD

TECHNICAL FIELD

The present disclosure relates to the field of network security technologies, and in particular to a blockchain-based big data analysis and decision-making system and method.

BACKGROUND

As research on blockchain technology becomes more and more in-depth, crossover research on a blockchain in various application fields is also booming, bringing new industry development opportunities to industries such as finance, electronic information, and big data.

The technical definition of the blockchain refers to a chain structure composed of a plurality of blocks. A blockchain structure is derived from the requirements on data storage, and has been increasingly widely applied in the information society. Main features of the blockchain include but are not limited to: Block data is stored in a distributed manner, which makes the block data can still be recovered by a multi-point storage characteristic of the blocks in the presence of partial corruption. Secondly, the block data has non-repudiation. Since it is infeasible to modify multi-point storage records simultaneously, the non-repudiation for the storage of data stored on the blocks can still be implemented by means of the synchronization of multi-point account books after single-point modification, thereby achieving relatively high data security.

As the impact of the blockchain on production industries has become increasingly evident, the prospect of applying the blockchain to cutting-edge industries such as big data is highlighted and the future is broad. In the rapidly developed information era, a new round of scientific revolution and transformation is accelerating and technological innovation is increasingly becoming an important driving force for reshaping the economic development model and promoting economic growth, and "big data" is undoubtedly the core driving force. The concept of "big data" was first put forward by Mckinsey & Company, a world-renowned consulting company, which defined big data as follows: a large-scale data set that greatly exceeds the capabilities of traditional database software tools in terms of acquisition, storage, management, and analysis. It has four major features: massive data scale, fast data flow, diverse data types, and low value density. The strategic significance of big data lies not in mastering huge amounts of data, but in professionally processing these meaningful data. It is generally appreciated that big data mainly has 4 typical features, that is, large volume, variety, velocity, and value. The first feature of big data is its large data scale. With the development of Internet, Internet of Things and mobile Internet technologies, all the trajectories of people and things can be recorded, rendering data showing an explosive growth. The universality of data sources determines the variety of data forms. Big data can be divided into three categories, in which the first one is structured data, such as data of financial systems, data of information management systems and data of medical systems, and is characterized by strong causal relationships between the data; the second one is non-structured data, such as videos, pictures and audios, and is characterized by no causal relationships between the data; and the third one is semi-structured data, such as HTML, documents, emails and webpages, and is characterized by weak causal relationships between the data. Statistics show that the structured data accounts for more than 75% of the whole Internet data volume at present. However, big data that produces value is often the non-structured data. The growth speed and processing speed of data are significant manifestations of the velocity feature of big data. Differing from previous production and propagation methods of traditional data media such as newspaper and letters, the exchange and propagation of big data are mainly implemented by Internet, cloud computing and other methods in the era of big data, and the speeds of producing and propagating data are very rapid. In addition, big data also requires a rapid response speed in data processing. For example, the analysis of hundreds of millions of pieces of data needs to be completed with a few seconds. The input, processing, and discarding of data needs to take effect immediately, with little delays. The core feature of big data is value. Indeed, the level of value density is inversely proportional to the size of a total data volume, that is, the higher the value density of data is, the smaller the total data volume is, and the lower the value density of data is, the larger the total data volume is. Any valuable information is extracted on the basis of massive basic data. Certainly, at present, a problem to be solved under the big data underground is: how to complete the value purification of data in massive data more rapidly by means of powerful machine algorithms.

During the network security protection, massive network security information and the protection and consolidation of network security attack information and defense information are often involved, and how to perform safe and reliable storage on network defense information and perform structured out-of-band management on the massive data while effectively defending has become a major problem about network security in the information era.

The present disclosure provides a blockchain-based big data analysis and decision-making system and method, which implement the consolidation of a key mapping table preset by the system by adopting on-chain storage of the blockchain, thereby avoiding the missing of an association relationship of security policy query in the process of performing decision-making for network security events. At the same time, by taking a security event as a unit, this application separates network attack data at an appropriate granularity more reasonably by analyzing network security attack events and fault events and performs targeted decision-making on the basis of event-based attack information, implementing the differentiated protection of network security and more accurate granularity of network security protection. Thirdly, based on security attack big data in a cloud computing system, this application migrates event-based security information big data to a cloud and consolidates its storage, which is convenient for the system to acquire relevant information of historical security events out of band, thereby effectively assisting the system in performing blockchain-based event-based target intelligent big data analysis and decision-making.

SUMMARY

The present disclosure is intended to provide a blockchain-based big data analysis and decision-making system and method, which are superior to the prior art.

To achieve the above objective, the present disclosure adopts the following technical solutions:

A blockchain-based big data analysis and decision-making system, including:
- a big data acquisition unit, configured to acquire security event messages from a plurality of network devices encountering security events, and transfer the security event messages to a cloud computing network for distributed archiving;
- the big data acquisition unit being also configured to parse the security event messages acquired from the plurality of network devices encountering the security events, send same to a database of a blockchain-based event-based target intelligent big data analysis and decision-making system, and store same as historical security events;
- a database of the blockchain-based event-based target intelligent big data analysis and decision-making system, configured to store the historical security events of the system;
- an on-chain storage area of blockchain, configured to store a network device security event confidence table and a security policy aggregation query table, which are preset by the system, on a blockchain in a non-repudiatory manner, and provide same to a device confidence module and a policy aggregation module for use;
- a plurality of network devices, each of which runs in the cloud computing network, processes a network data processing request made by a client, and returns a data processing result;
- the network devices being also configured to send the security event messages to a security event normalizer of the blockchain-based event-based target intelligent big data analysis and decision-making system while encountering network security events;
- the security event messages being configured to record acquisition record information when the network devices encounter the network security events;
- where the security event messages being configured to record acquisition record information when the network devices encounter the network security events being specifically as follows: when the network device A encounters a network security event, the security event message at least recording a network device ID of the network device, a first security event parameter set, and security event occurrence level and association level;
- a security event normalizer, configured to perform event-based message normalization processing on the security event messages sent by the network devices, and at least disassemble the security event messages to a network device ID field of the network device, a first security event parameter set field, and a security event occurrence level and association level field;
- the security event normalizer being also configured to: encapsulate the network device ID field of the network devices into first event decision-making data, and send same to the device confidence module; encapsulate the first security event parameter set field into second event decision-making data, and send same to the policy aggregation module; and encapsulate the security event occurrence level and association level field into third event decision-making data, and send same to a processing level module;
- a device confidence module, configured to receive the first event decision-making data, parse network device IDs of the network devices therein, search the network device security event confidence table based on the network device IDs, and determine security event confidence values of the network devices and send same to an intelligent management decision-making module;
- a policy aggregation module, configured to receive and parse the second event decision-making data, determine a corresponding security policy aggregation based on the first security event parameter set field, and send the corresponding security policy aggregation to the intelligent management decision-making module;
- a processing level module; configured to receive the third event decision-making data, parse the security event occurrence level and association level therein, determine corresponding permission requirements of a security event processing and operation level based on the security event occurrence level and association level, and send the determined corresponding permission requirements of the security event processing and operation level to the intelligent management decision-making module;
- the corresponding permission requirements of the security event processing and operation level being at least higher than or equal to a security event association level;
- an intelligent management decision-making module, receiving the security event confidence values of the network devices, the security policy aggregation, and the corresponding permission requirements of the security event processing and operation level, and determining whether to perform intelligent management decision-making of the security events based on the comparison of the security event confidence values and a confidence threshold;
- the determining whether to perform intelligent management decision-making of the security events based on the comparison of the security event confidence values and a confidence threshold being specifically as follows:
- when the security event confidence values are greater than the confidence threshold, directly performing the intelligent management decision-making of the security events; when the security event confidence values are less than the confidence threshold, taking the security event confidence value K1 as a possibility and adopting a randomized algorithm to determine whether a result of selecting a random number within a range of [0,1] falls within [0,K1]; if so, performing the intelligent management decision-making of the security events; if not, not performing the intelligent management decision-making of the security events, and confirming as a false alarm of the security events;
- the intelligent management decision-making of the security events at least including: granting a processing and operation level permission requested by the permission requirements of the security event processing and operation level to a security event processing object, and adopting a corresponding security policy to process the security events based on the security policy aggregation and recording into a database.

Preferably, the network devices may be a cloud computing edge server, a router, a gateway or a service host.

Preferably, the network security events at least include one of the following events: a network attack event, a non-attack type network fault event, and a network information security level change event.

Preferably, the network device security event confidence table is preset by the blockchain-based event-based target intelligent big data analysis and decision-making system; the network device security event confidence table at least includes network device ID information and network device security event confidence values corresponding to the network device ID information one by one; and the network device security event confidence values are calculated based on a confidence level of the historical security events of the network devices stored in the system database.

Preferably, the confidence level of the historical security events of the network devices stored in the system database is equivalent to a false alarm possibility of the historical security events of the network devices, and is updated and dynamically changed along with continuous reporting for the historical security events of the network devices.

At the same time, this application also claims a blockchain-based big data analysis method, the method including:

Step 1: operating a big data acquisition unit to acquire security event messages from a plurality of network devices encountering security events, and transfer the security event messages to the cloud computing network for distributed archiving;

the big data acquisition unit being also configured to parse the security event messages acquired from the plurality of network devices encountering the security events, send same to a database of a blockchain-based big data analysis and decision-making system, and store same as historical security events;

operating the database of the blockchain-based big data analysis and decision-making system to store the historical security events of the system;

Step 2: operating an on-chain storage area of blockchain to store a network device security event confidence table and a security policy aggregation query table, which are preset by the system, on a blockchain in a non-repudiatory manner, and provide same to a device confidence module and a policy aggregation module for use;

Step 3: operating each of the plurality of network devices to run in the cloud computing network, process a network data processing request made by a client and return a data processing result; the network devices being also configured to send the security event messages to a security event normalizer of the blockchain-based big data analysis and decision-making system while encountering network security events; the security event messages being configured to record acquisition record information when the network devices encounter the network security events;

where the security event messages being configured to record acquisition record information when the network devices encounter the network security events being specifically as follows: when the network device A encounters a network security event, the security event message at least recording a network device ID of the network device, a first security event parameter set, and security event occurrence level and association level;

Step 4: operating a security event normalizer to perform event-based message normalization processing on the security event messages sent by the network devices, and at least disassemble the security event messages to a network device ID field of the network device, a first security event parameter set field, and a security event occurrence level and association level field;

the security event normalizer being also configured to: encapsulate the network device ID field of the network devices into first event decision-making data, and send same to the device confidence module; encapsulate the first security event parameter set field into second event decision-making data, and send same to the policy aggregation module; and encapsulate the security event occurrence level and association level field into third event decision-making data, and send same to a processing level module;

Step 5: operating a device confidence module to receive the first event decision-making data, parse network device IDs of the network devices therein, search the network device security event confidence table based on the network device IDs, and determine security event confidence values of the network devices and send same to an intelligent management decision-making module;

Step 6: operating a policy aggregation module to receive and parse the second event decision-making data, determine a corresponding security policy aggregation based on the first security event parameter set field, and send the corresponding security policy aggregation to the intelligent management decision-making module;

Step 7: operating a processing level module to receive the third event decision-making data, parse the security event occurrence level and association level therein, determine corresponding permission requirements of a security event processing and operation level based on the security event occurrence level and association level, and send the determined corresponding permission requirements of the security event processing and operation level to the intelligent management decision-making module;

where the corresponding permission requirements of the security event processing and operation level being at least higher than or equal to a security event association level;

Step 8: operating the intelligent management decision-making module to receive the security event confidence values of the network devices, the security policy aggregation, and the corresponding permission requirements of the security event processing and operation level, and determine whether to perform intelligent management decision-making of the security events based on the comparison of the security event confidence values and a confidence threshold;

where the determine whether to perform intelligent management decision-making of the security events based on the comparison of the security event confidence values and a confidence threshold being specifically as follows:

when the security event confidence values are greater than the confidence threshold, directly performing the intelligent management decision-making of the security events; when the security event confidence values are less than the confidence threshold, taking the security event confidence value K1 as a possibility and adopting a randomized algorithm to determine whether a result of selecting a random number within a range of [0,1] falls within [0,K1]; if so, performing the intelligent management decision-making of the security events; if not, not performing the intelligent management decision-making of the security events, and confirming as a false alarm of the security events;

the intelligent management decision-making of the security events at least including: granting a processing and operation level permission requested by the permission requirements of the security event processing and operation level to a security event processing object, and adopting a corresponding security policy to process the security events based on the security policy aggregation and recording into a database.

Preferably, the network devices may be a cloud computing edge server, a router, a gateway or a service host.

Preferably, the network security events at least include one of the following events: a network attack event, a non-attack type network fault event, and a network information security level change event.

Preferably, the network device security event confidence table is preset by the blockchain-based big data analysis and decision-making system; the network device security event confidence table at least includes network device ID information and network device security event confidence values corresponding to the network device ID information one by one; and the network device security event confidence values are calculated based on a confidence level of the historical security events of the network devices stored in the system database.

Preferably, the confidence level of the historical security events of the network devices stored in the system database is equivalent to a false alarm possibility of the historical security events of the network devices, and is updated and dynamically changed along with continuous reporting for the historical security events of the network devices.

The present disclosure provides a blockchain-based big data analysis and decision-making system and method. Based on security incidents with events as granularity, network attack data is separated at an appropriate granularity more reasonably by means of event-based analysis for network security attacks and faults and targeted decision-making is performed on the basis of event-based attack information, implementing the differentiated protection of network security and more accurate granularity of network security protection. At the same time, the present disclosure utilizes a consolidated storage of big data to save historical data of a security system, so as to provide data supports during a security event processing process, and obtain a better event-based system security analysis decision-making and processing effect compared with the prior art.

DETAILED DESCRIPTION

A plurality of embodiments and beneficial effects of a blockchain-based big data analysis and decision-making system set forth in the present disclosure is described below in detail, so as to facilitate more detailed examination and decomposition of the present disclosure.

For the sake of a better understanding of the technical solutions of the present disclosure, the embodiments of the present disclosure are described in detail below with reference to the accompanying drawings.

It should be pointed out that, the described embodiments are only some embodiments rather than all the embodiments of present disclosure. All other embodiments obtained by a person of ordinary skill in the art based on the embodiments of the present disclosure without creative efforts shall fall within the protection scope of the present disclosure.

The terms used in the embodiments of the present disclosure are merely for the purpose of illustrating specific embodiments, and are not intended to limit the present disclosure. The terms "a", "said" and "the" of singular forms used in the embodiments and the appended claims of the present disclosure are also intended to include plural forms, unless otherwise specified in the context clearly.

It should be understood that the term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that although the embodiments of the present disclosure may describe a method and a corresponding device by using terms such as first, second, and third, these keywords should not be limited to these terms. These terms are merely used to distinguish keywords from each another. For example, in a case of not departing from the range of the embodiments of the present disclosure, a first parameter set, first event decision-making data and the like may also be called as a second parameter set and second event decision-making data. Similarly, the second parameter set, the second event decision-making data and the like may also be called the first parameter set and the first event decision-making data.

Depending on the context, for example, words "if" or "as if" used herein may be explained as "while . . . " or "when . . . " or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detection (of the stated condition or event)."

Figure 1:
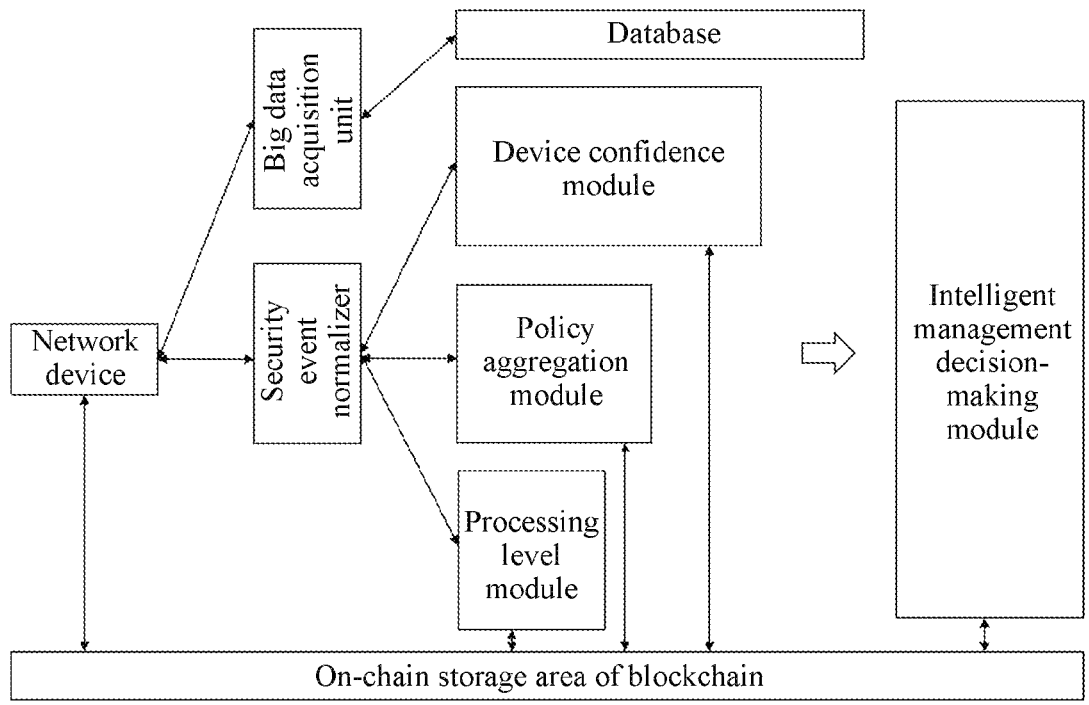
FIG. 1 is a basic system structure diagram of a blockchain-based big data analysis and decision-making system illustrated in the prevent disclosure.
Figure 2:
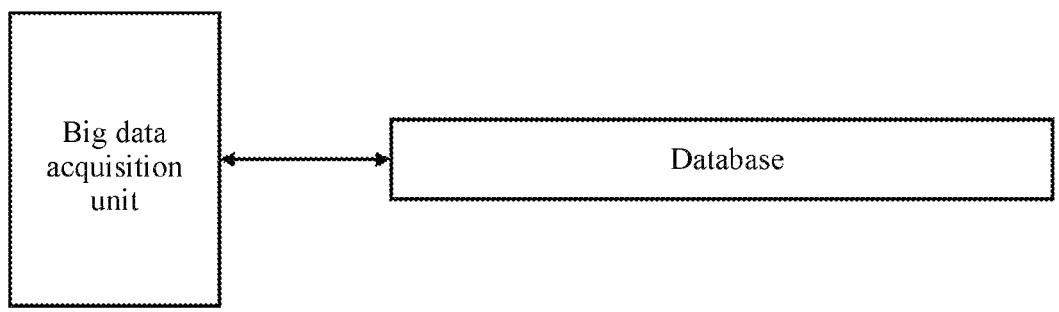
FIG. 2 is a basic system structure diagram of interconnection between a big data acquisition unit and a database module in a blockchain-based big data analysis and decision-making system illustrated in the prevent disclosure.
Figure 3:
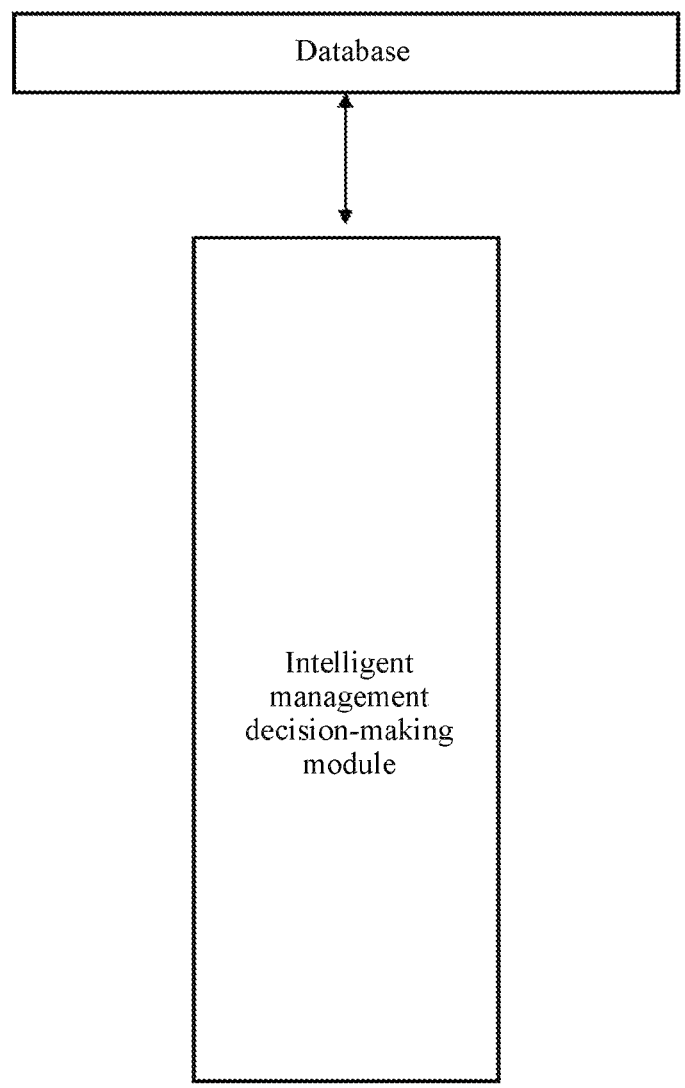
FIG. 3 is a basic system structure diagram of interconnection between a database module and an intelligent management decision-making module in a blockchain-based big data analysis and decision-making system illustrated in the prevent disclosure.

As shown in FIG. 1 to FIG. 3 in the specification, FIG. 1 to FIG. 3 in the specification are of one of embodiments of an interconnection relationship between a blockchain-based big data analysis and decision-making system set forth in the present disclosure and specific included modules thereof, and the system includes:

a plurality of network devices, each of which runs in a cloud computing network, processes a network data processing request made by a client, and returns a data processing result;

the network devices being also configured to send the security event messages to a security event normalizer of the blockchain-based big data analysis and decision-making system while encountering network security events;

the security event messages being used for recording acquisition record information when the network devices encounter the network security events;

where the security event messages being used for recording acquisition record information when the network devices encounter the network security events being specifically as follows: when the network device A encounters a network security event, the security event message at least recording a network device ID of the network device, a first security event parameter set, and security event occurrence level and association level;

As a superimposable preferred embodiment, the security event messages being used for recording acquisition record information when the network devices encounter network security events may be specifically as follows: when the network device A encounters a network security event, the security event message at least records a network device ID, a first security event parameter set, and security event occurrence level and association level; the network device ID is used for characterizing the anisotropy of the network device and identifying the network device, and the first security event parameter set at least includes: a data message protocol flow table of this security event and is used for recording and summarizing types of wrongly transmitted data message protocol clusters; a security fault range, used for determining a concurrence range of security faults; and a newly-occurred security fault indicator, used for determining whether this security fault is a newly-occurred security fault within a specific period. As another superimposable preferred embodiment, the concurrence range of the security faults is used for: when the network device A has a fault, enabling the network device A to send a fault detection message to the same type of network devices directly connected thereto or at upstream and downstream thereof, for detecting the same type of network devices directly connected thereto or at upstream and downstream thereof have the same type of fault; and when the same type of network devices directly connected to or at upstream and downstream of the network device A have the same type of fault, continuing to send the fault detection message to the same type of network devices directly connected to or at upstream and downstream of the same type of network devices directly connected to or at upstream and downstream of the network device A, for detecting whether the same type of network devices directly connected to or at upstream and downstream of the same type of network devices directly connected to or at upstream and downstream of the network device A have the same type of fault; and when no fault occurs or the fault detection message has been sent for at least three times, stopping sending the fault detection message. The value of the security fault range is the number of times of sending the fault detection message. If the fault detection message has been sent for at least three times, reaching the upper limit, the value of the security fault range is equal to 3. The newly-occurred security fault indicator is used for determining whether a specific network device has a fault newly occurred for the first time within a specific maintenance period, for example, 3 days, determining a fault occurrence rate of the network device, and determining a repairing probability based on the fault occurrence rate of the network device; and the repairing probability is in direct proportion to the newly-occurred security fault indicator. If the fault of the network device in the specific network is a newly-occurred one, the newly-occurred security fault indicator is 1, and is used for characterizing this fault; and if the fault of the network device in the specific network is not a newly-occurred one and has occurred for K times, the newly-occurred security fault indicator is K+1. As another superimposable preferred embodiment, the security event occurrence level and association level is used for characterizing an occurrence level and an association level of the security events. As another superimposable preferred embodiment, the occurrence level is used for: characterizing that a fault of the security events comes from a delivery layer of the cloud computing system, that is, an underlying client layer; or an edge joint layer, that is, a network device layer from the underlying client layer (not included) to a cloud edge device; or a cloud center layer, that is, one layer of cloud center layers from a cloud computing center of the blockchain-based big data analysis and decision-making system to each cloud edge device (not included); and taking a previous level (if any) of the occurrence level of the network security event as the association level of the security event and recording same in the security event occurrence level and association level field of the security event message.

a security event normalizer, the security event normalizer being configured to perform event-based message normalization processing on the security event messages sent by the network devices, and at least disassemble the security event messages to a network device ID field of the network device, a first security event parameter set field, and a security event occurrence level and association level field;

the security event normalizer being also configured to: encapsulate the network device ID field of the network devices into first event decision-making data, and send same to the device confidence module; encapsulate the first security event parameter set field into second event decision-making data, and send same to the policy aggregation module; and encapsulate the security event occurrence level and association level field into third event decision-making data, and send same to a processing level module;

a device confidence module, configured to receive the first event decision-making data, parse network device IDs of the network devices therein, search the network device security event confidence table based on the network device IDs, and determine security event confidence values of the network devices and send same to an intelligent management decision-making module;

a policy aggregation module, the policy aggregation module being configured to receive and parse the second event decision-making data, determine a corresponding security policy aggregation based on the first security event parameter set field, and send the corresponding security policy aggregation to the intelligent management decision-making module;

As a superimposable preferred embodiment, the policy aggregation module, the policy aggregation module being configured to receive and parse the second event decision-making data and determine a corresponding security policy aggregation based on the first security event parameter set field is specifically as follows: the policy aggregation module parses the security event data message protocol flow table, a security fault range field and the newly-occurred security fault indicator, and commonly determines a corresponding security event management policy based on the security event data message protocol flow table, the security fault range field and the newly-occurred security fault indicator; and the security event management policy may be decided by a system administrator based on the above indicator, and may also be automatically decided by the system based on the security policy aggregation query table.

As a superimposable preferred embodiment, a security policy aggregation query table preset by the system is stored in the security policy aggregation module; the security policy aggregation query table at least includes each security policy and corresponding security event data message protocol flow table, security fault range field and newly-occurred security fault indicator thereof; and by querying the security event data message protocol flow table, security fault range field and newly-occurred security fault indicator carried by the security event message, a corresponding security policy aggregation may be queried in the security policy aggregation query table, and the corresponding security policy aggregation may be sent to the intelligent management decision-making module.

- a processing level module; the processing level module being configured to receive the third event decision-making data, parse the security event occurrence level and association level therein, determine corresponding permission requirements of a security event processing and operation level based on the security event occurrence level and association level, and send the determined corresponding permission requirements of the security event processing and operation level to the intelligent management decision-making module;
- where the corresponding permission requirements of the security event processing and operation level being at least higher than or equal to a security event association level;
- an intelligent management decision-making module, the intelligent management decision-making module receiving the security event confidence values of the network devices, the security policy aggregation, and the corresponding permission requirements of the security event processing and operation level, and determining whether to perform intelligent management decision-making of the security events based on the comparison of the security event confidence values and a confidence threshold;
- where the determining whether to perform intelligent management decision-making of the security events based on the comparison of the security event confidence values and a confidence threshold being specifically as follows:
- when the security event confidence values are greater than the confidence threshold, directly performing the intelligent management decision-making of the security events; when the security event confidence values are less than the confidence threshold, taking the security event confidence value K1 as a possibility and adopting a randomized algorithm to determine whether a result of selecting a random number within a [0,1] range falls within a range of [0,K1]; if so, performing the intelligent management decision-making of the security events; if not, not performing the intelligent management decision-making of the security events, and confirming as a false alarm of the security events;
- the intelligent management decision-making of the security events at least including: granting a processing and operation level permission requested by the permission requirements of the security event processing and operation level to a security event processing object, and adopting a corresponding security policy to process the security events based on the security policy aggregation and recording into a database.

As a superimposable preferred embodiment, the network devices may be a cloud computing edge server, a router, a gateway or a service host.

As another superimposable preferred embodiment, the network security events at least include one of the following events: a network attack event, a non-attack type network fault event, and a network information security level change event.

As another superimposable preferred embodiment, the network device security event confidence table is preset by the blockchain-based big data analysis and decision-making system; the network device security event confidence table at least includes network device ID information and network device security event confidence values corresponding to the network device ID information one by one; and the network device security event confidence values are calculated based on a confidence level of the historical security events of the network devices stored in the system database.

As another superimposable preferred embodiment, the confidence level of the historical security events of the network devices stored in the system database is equivalent to a false alarm possibility of the historical security events of the network devices, and is updated and dynamically changed along with continuous reporting for the historical security events of the network devices.

Figure 4:
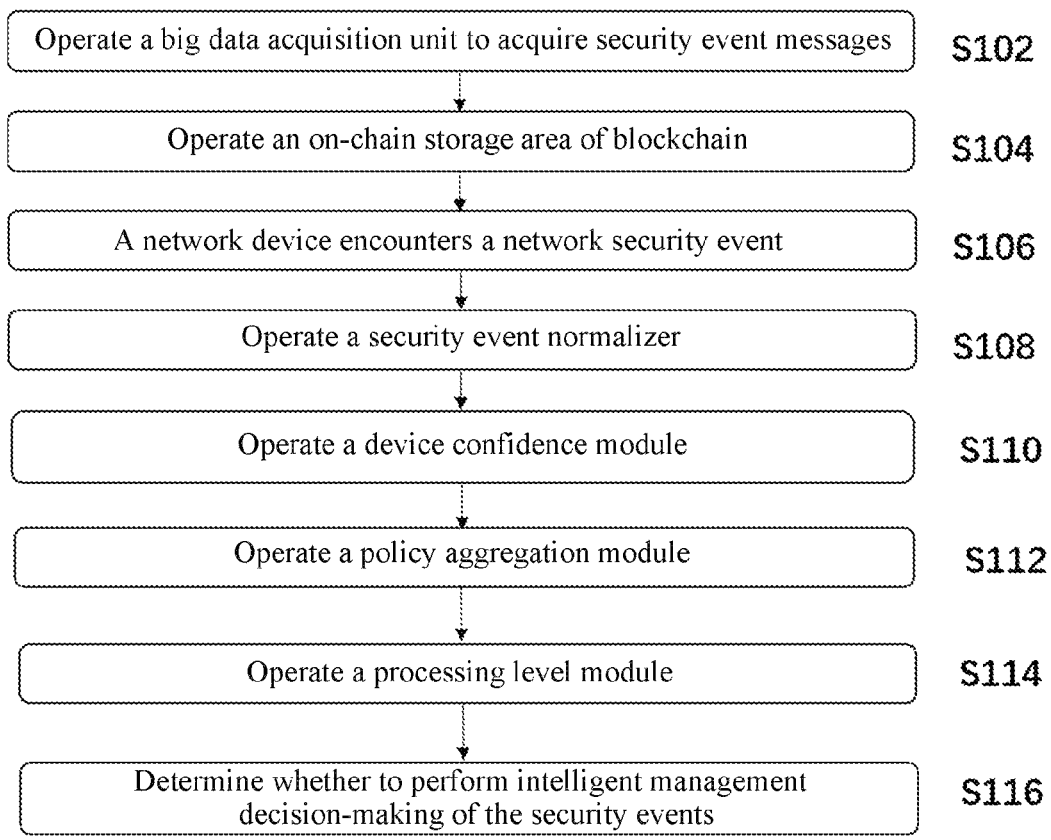
FIG. 4 is a preferred embodiment of a step flowchart of a blockchain-based big data analysis method illustrated in the prevent disclosure.
Figure 5:
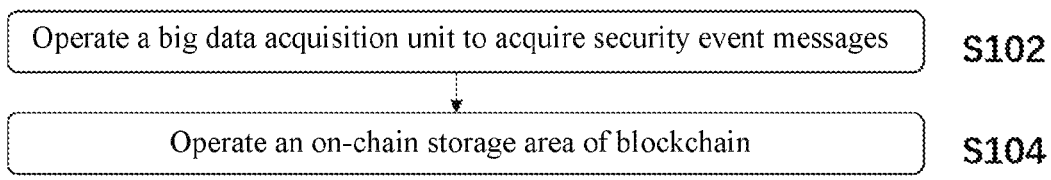
FIG. 5 is a preferred display embodiment schematic diagram of steps of operating a big data acquisition unit and an on-chain storage area of blockchain of a blockchain-based big data analysis method illustrated in the prevent disclosure.

As shown in FIG. 4 to FIG. 5 in the specification, FIG. 4 to FIG. 5 in the specification are preferred display embodiment schematic diagrams of the blockchain-based big data analysis method set forth in the present disclosure a steps of performing intelligent management decision-making of the security events, and the method includes:

- Step S102: operating a big data acquisition unit to acquire security event messages from a plurality of network devices encountering security events, and transfer the security event messages to the cloud computing network for distributed archiving;
- the big data acquisition unit being also configured to parse the security event messages acquired from the plurality of network devices encountering the security events, send same to a database of a blockchain-based big data analysis and decision-making system, and store same as historical security events;
- operate the database of the blockchain-based big data analysis and decision-making system to store the historical security events of the system;
- Step S104: operate an on-chain storage area of blockchain to store a network device security event confidence table and a security policy aggregation query table, which are preset by the system, on a blockchain in a non-repudiatory manner, and provide same to a device confidence module and a policy aggregation module for use;
- Step S106: operate each of the plurality of network devices to run in the cloud computing network, process a network data processing request made by a client, and return a data processing result; the network devices being also configured to send the security event messages to a security event normalizer of the blockchain-based big data analysis and decision-making system while encountering network security events; the security event messages being used for recording acquisition record information when the network devices encounter the network security events;
- where the security event messages being used for recording acquisition record information when the network devices encounter the network security events being specifically as follows: when the network device A encounters a network security event, the security event message at least recording a network device ID of the network device, a first security event parameter set, and security event occurrence level and association level;

Step S108: operate a security event normalizer to perform event-based message normalization processing on the security event messages sent by the network devices, and at least disassemble the security event messages to a network device ID field of the network device, a first security event parameter set field, and a security event occurrence level and association level field;

the security event normalizer being also configured to: encapsulate the network device ID field of the network devices into first event decision-making data, and send same to the device confidence module; encapsulate the first security event parameter set field into second event decision-making data, and send same to the policy aggregation module; and encapsulate the security event occurrence level and association level field into third event decision-making data, and send same to a processing level module;

Step S110: operate a device confidence module to receive the first event decision-making data, parse network device IDs of the network devices therein, search the network device security event confidence table based on the network device IDs, and determine security event confidence values of the network devices and send same to an intelligent management decision-making module;

Step S112: operate a policy aggregation module to receive and parse the second event decision-making data, determine a corresponding security policy aggregation based on the first security event parameter set field, and send the corresponding security policy aggregation to the intelligent management decision-making module;

Step S114: operate a processing level module to receive the third event decision-making data, parse the security event occurrence level and association level therein, determine corresponding permission requirements of a security event processing and operation level based on the security event occurrence level and association level, and send the determined corresponding permission requirements of the security event processing and operation level to the intelligent management decision-making module;

where the corresponding permission requirements of the security event processing and operation level being at least higher than or equal to a security event association level;

Step S116: operate the intelligent management decision-making module to receive the security event confidence values of the network devices, the security policy aggregation, and the corresponding permission requirements of the security event processing and operation level, and determine whether to perform intelligent management decision-making of the security events based on the comparison of the security event confidence values and a confidence threshold;

where the determine whether to perform intelligent management decision-making of the security events based on the comparison of the security event confidence values and a confidence threshold being specifically as follows:

when the security event confidence values are greater than the confidence threshold, directly performing the intelligent management decision-making of the security events; when the security event confidence values are less than the confidence threshold, take the security event confidence value K1 as a possibility and adopt a randomized algorithm to determine whether a result of selecting a random number within a [0,1] range falls within a range of [0,K1]; if so, perform the intelligent management decision-making of the security events; if not, not perform the intelligent management decision making of the security events, and confirm as a false alarm of the security events;

the intelligent management decision-making of the security events at least including: granting a processing and operation level permission requested by the permission requirements of the security event processing and operation level to a security event processing object, and adopting a corresponding security policy to process the security events based on the security policy aggregation and recording into a database.

As another superimposable preferred embodiment, the network devices may be a cloud computing edge server, a router, a gateway or a service host.

As another superimposable preferred embodiment, the network security events at least include one of the following events: a network attack event, a non-attack type network fault event, and a network information security level change event.

As another superimposable preferred embodiment, the network device security event confidence table is preset by the blockchain-based big data analysis and decision-making system; the network device security event confidence table at least includes network device ID information and network device security event confidence values corresponding to the network device ID information one by one; and the network device security event confidence values are calculated based on a confidence level of the historical security events of the network devices stored in the system database.

As another superimposable preferred embodiment, the confidence level of the historical security events of the network devices stored in the system database is equivalent to a false alarm possibility of the historical security events of the network devices, and is updated and dynamically changed along with continuous reporting for the historical security events of the network devices.

The present disclosure provides a blockchain-based big data analysis and decision-making system and method, which avoid the missing of an association relationship of security policy query by performing mapping on security events. Furthermore, network attack data is separated at an appropriate granularity more reasonably by splitting security events of the system and targeted decision-making is performed on the basis of event-based attack information, implementing the differentiated protection of network security and more accurate granularity of network security protection. Thirdly, based on security attack big data in a cloud computing system, this application migrates event-based security information big data to a cloud and consolidates its storage, which is convenient for the system to acquire relevant information of historical security events out of band, providing effective big data supports for intelligent analysis and decision-making of the security events.

In all the above implementations, to implement the requirements on some special data transmission and read/write functions, differences of devices, modules, components, hardware, pin connections or memory and processors can be added for the operation process of the above method and a corresponding device thereof, so as to expand functions.

A person skilled in the art can clearly understand that for convenience and conciseness of description, for specific working processes of the methods, devices and units described above, reference may be made to the corresponding processes in the foregoing method embodiments, and details are not described herein again.

In the several embodiments provided in the present disclosure, it should be understood that the disclosed system, device, and method may be implemented in other manners. For example, the described device embodiment is merely an example. For example, the method step division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

All the units described as steps of the method and separate components of the device may or may not be logically or physically separated, and may also not be physical units, that is, may be located in one place, or may be distributed over a plurality of network units. Some or all of the units may be selected according to actual needs to achieve the objectives of the solutions of the embodiments.

In addition, all method steps and implementations thereof and functional units in the embodiments of the present disclosure may be integrated into one processing unit, or each of the units may exist alone physically, or two or more units may be integrated into one unit. The integrated unit may be implemented in the form of hardware, or may be implemented in the form of hardware combined with a software functional unit.

The integrated unit that may be implemented by the method and the device in the form of a software functional unit may be stored in a computer-readable storage medium. The software functional unit is stored in a storage medium and includes a plurality of instructions to cause a computer device (which may be a personal computer, a server, a network device, or the like) or a processor to perform some of the steps of the methods described in the embodiments of the present disclosure. The foregoing storage medium includes: any medium that can store program code, such as a USB flash drive, a removable hard disk, a read-only memory (ROM), a random access memory (RAM), an NVRAM, a magnetic disk, or an optical disc.

The above descriptions are merely preferred embodiments of the present disclosure, but are not intended to limit the present disclosure. Any modification, equivalent replacement, or improvement made within the spirit and principle of the present disclosure shall fall within the protection scope of the present disclosure.

It should be noted that: the above embodiments are merely used for describing the technical solutions of the present disclosure, but are not intended to limit the present disclosure. Although the present disclosure is described in detail with reference to the foregoing embodiments, it should be appreciated by a person skilled in the art that, modifications may still be made to the technical solutions described in the foregoing embodiments, or equivalent replacements may be made to the part of the technical features; and these modifications or replacements will not cause the essence of corresponding technical solutions to depart from the spirit and scope of the technical solutions in the embodiments of the present disclosure.

What is claimed is:

1. A blockchain-based big data analysis method, the method comprising:

Step 1: operating a big data acquisition unit to acquire security event messages from a plurality of network devices encountering security events, and transfer the security event messages to the cloud computing network for distributed archiving;

the big data acquisition unit being also configured to parse the security event messages acquired from the plurality of network devices encountering the security events, send same to a database of a blockchain-based event-based target intelligent big data analysis and decision-making system, and store same as historical security events;

operating the database of the blockchain-based event-based target intelligent big data analysis and decision-making system to store the historical security events of the system;

Step 2: operating an on-chain storage area of blockchain to store a network device security event confidence table and a security policy aggregation query table, which are preset by the system, on a blockchain in a non-repudiatory manner, and provide same to a device confidence module and a policy aggregation module for use;

Step 3: operating each of the plurality of network devices to run in the cloud computing network, process a network data processing request made by a client, and return a data processing result; the network devices being also configured to send the security event messages to a security event normalizer of the blockchain-based event-based target intelligent big data analysis and decision-making system while encountering network security events;

the security event messages being configured to record acquisition record information when the network devices encounter the network security events;

wherein the security event messages being configured to record acquisition record information when the network devices encounter the network security events being specifically as follows: when the network device A encounters a network security event, the security event message at least recording a network device ID of the network device, a first security event parameter set, and security event occurrence level and association level;

Step 4: operating a security event normalizer to perform event-based message normalization processing on the security event messages sent by the network devices, and at least disassemble the security event messages to a network device ID field of the network device, a first security event parameter set field, and a security event occurrence level and association level field;

the security event normalizer being also configured to encapsulate the network device ID field of the network devices into first event decision-making data, and send same to the device confidence module; encapsulate the first security event parameter set field into second event decision-making data, and send same to the policy aggregation module; and encapsulate the security event occurrence level and association level field into third event decision-making data, and send same to a processing level module;

Step 5: operating a device confidence module to receive the first event decision-making data, parse network device IDs of the network devices therein, search the network device security event confidence table based on the network device IDs, and determine security event confidence values of the network devices and send same to an intelligent management decision-making module;

Step 6: operating a policy aggregation module to receive and parse the second event decision-making data, determine a corresponding security policy aggregation based on the first security event parameter set field, and send the corresponding security policy aggregation to the intelligent management decision-making module;

Step 7: operating a processing level module to receive the third event decision-making data, parse the security event occurrence level and association level therein, determine corresponding permission requirements of a security event processing and operation level based on the security event occurrence level and association level, and send the determined corresponding permission requirements of the security event processing and operation level to the intelligent management decision-making module; and wherein the corresponding permission requirements of the security event processing and operation level being at least higher than or equal to a security event association level;

Step 8: operating the intelligent management decision-making module to receive the security event confidence values of the network devices, the security policy aggregation, and the corresponding permission requirements of the security event processing and operation level, and determine whether to perform intelligent management decision-making of the security events based on the comparison of the security event confidence values and a confidence threshold;

wherein the determine whether to perform intelligent management decision-making of the security events based on the comparison of the security event confidence values and a confidence threshold being specifically as follows:

when the security event confidence values are greater than the confidence threshold, directly performing the intelligent management decision-making of the security events; when the security event confidence values are less than the confidence threshold, taking the security event confidence value K1 as a possibility and adopting a randomized algorithm to determine whether a result of selecting a random number within a range of [0,1] falls within [0,K1]; if so, performing the intelligent management decision-making of the security events; if not, not performing the intelligent management decision-making of the security events, and confirming as a false alarm of the security events; wherein, the intelligent management decision-making of the security events at least comprising: granting a processing and operation level permission requested by the permission requirements of the security event processing and operation level to a security event processing object, and adopting a corresponding security policy to process the security events based on the security policy aggregation and recording into a database.

2. The blockchain-based big data analysis method according to claim 1, wherein the network device can be a cloud computing edge server, a router, a gateway or a service host.

3. The blockchain-based big data analysis method according to claim 2, wherein the network security events at least comprise one of the following events: a network attack event, a non-attack type network fault event, and a network information security level change event.

4. The blockchain-based big data analysis method according to claim 2, wherein:

the network device security event confidence table is preset by the blockchain-based event-based target intelligent big data analysis and decision-making system; the network device security event confidence table at least comprises network device ID information and network device security event confidence values corresponding to the network device ID information one by one; and the network device security event confidence values are calculated based on a confidence level of the historical security events of the network devices stored in the system database.

5. The blockchain-based big data analysis method according to claim 4, wherein:

the confidence level of the historical security events of the network devices stored in the system database is equivalent to a false alarm possibility of the historical security events of the network devices, and is updated and dynamically changed along with continuous reporting for the historical security events of the network devices.

* * * * *